United States Patent [19]

Fiech

[11] Patent Number: 5,586,586

[45] Date of Patent: *Dec. 24, 1996

[54] UNITIZED FUEL STORAGE SYSTEM

[76] Inventor: Manfred M. Fiech, c/o Euro Tank, P.O. Box 478, Silver Springs, Fla. 33489-0478

[*] Notice: The term of this patent shall not extend beyond the expiration date of Pat. No. 5,390,713.

[21] Appl. No.: 383,505

[22] Filed: Feb. 2, 1995

Related U.S. Application Data

[63] Continuation-in-part of Ser. No. 988,836, Dec. 10, 1992, Pat. No. 5,390,713.

[51] Int. Cl.$^6$ ........................................ B67D 5/60
[52] U.S. Cl. ................... 141/98; 141/59; 141/95; 141/325; 141/285; 73/49.2; 137/590; 137/234.6; 137/587; 405/52
[58] Field of Search .................. 141/44, 45, 59, 141/83, 86, 88, 95, 98, 100, 104, 285, 290, 325; 73/49.2 T, 49.2 R, 40, 49.3; 405/52–55; 137/88, 93, 234.6, 312, 314, 363, 364, 375, 576, 587, 588, 590, 591; 220/565

[56] References Cited

U.S. PATENT DOCUMENTS

| 1,622,030 | 12/1922 | Edwards . | |
| 1,869,010 | 7/1932 | Jenkins | 137/234.6 X |
| 1,979,451 | 7/1933 | Clapp . | |
| 2,004,074 | 6/1935 | Kiley . | |
| 2,260,356 | 10/1941 | White . | |
| 2,959,826 | 11/1960 | Larsen et al. | 137/234.6 X |
| 3,288,321 | 11/1966 | Wokas | 137/590 X |
| 3,532,114 | 3/1968 | DeFrees | 137/588 |
| 3,815,327 | 6/1974 | Viland | 55/80 |
| 3,915,206 | 10/1975 | Fowler et al. | 141/59 |
| 4,090,525 | 5/1978 | Potter | 137/171 |
| 4,100,758 | 7/1978 | Mayer | 62/54 |
| 4,147,269 | 4/1979 | Werts | 220/565 |
| 4,166,485 | 9/1979 | Wokas | 141/59 X |
| 4,592,386 | 6/1986 | Mooney | 137/588 |
| 4,615,362 | 10/1986 | Hartman et al. | 141/86 |
| 4,639,164 | 1/1987 | Pugnale et al. | 405/54 |
| 4,685,327 | 8/1987 | Sharp | 73/49.2 T |
| 4,807,675 | 2/1989 | Sharp | 141/86 |
| 4,818,151 | 4/1989 | Moreland | 405/53 X |
| 4,871,084 | 10/1989 | Robbins | 137/363 |
| 4,884,709 | 12/1989 | McCarthy | 220/565 |
| 4,951,844 | 8/1990 | Sharp | 220/469 |
| 4,968,179 | 11/1990 | Frahm | 405/53 |
| 4,989,447 | 2/1991 | Gelin | 73/49.2 T |
| 5,018,558 | 5/1991 | Sharp | 141/59 |
| 5,038,838 | 8/1991 | Bergamini et al. | 141/59 |
| 5,117,677 | 6/1992 | Hendershot et al. | 73/49.2 T |
| 5,167,142 | 12/1992 | Sharp | 73/49.2 T |
| 5,186,222 | 2/1993 | Brano | 141/86 |
| 5,217,052 | 6/1993 | Sharp | 141/86 |
| 5,246,044 | 9/1993 | Robertson et al. | 141/86 |

FOREIGN PATENT DOCUMENTS

| 1118037 | 11/1961 | Germany | 137/234.6 |

Primary Examiner—J. Casimer Jacyna
Attorney, Agent, or Firm—Cushman Darby & Cushman, L.L.P.

[57] ABSTRACT

A unitized tank structure including a vessel having at least first and second compartments. Fill lines are coupled to the vessel providing access to fill the first and second compartments of the vessel. At least one sump riser portion is coupled to the vessel and extends therefrom. At least first and second dispensing lines are disposed within the sump riser portion and penetrate the vessel. Each dispensing line extends within the vessel and within the first and second compartments. Cross-over venting structure is provided within the vessel and is constructed and arranged to provide venting between the first and second compartments.

15 Claims, 17 Drawing Sheets

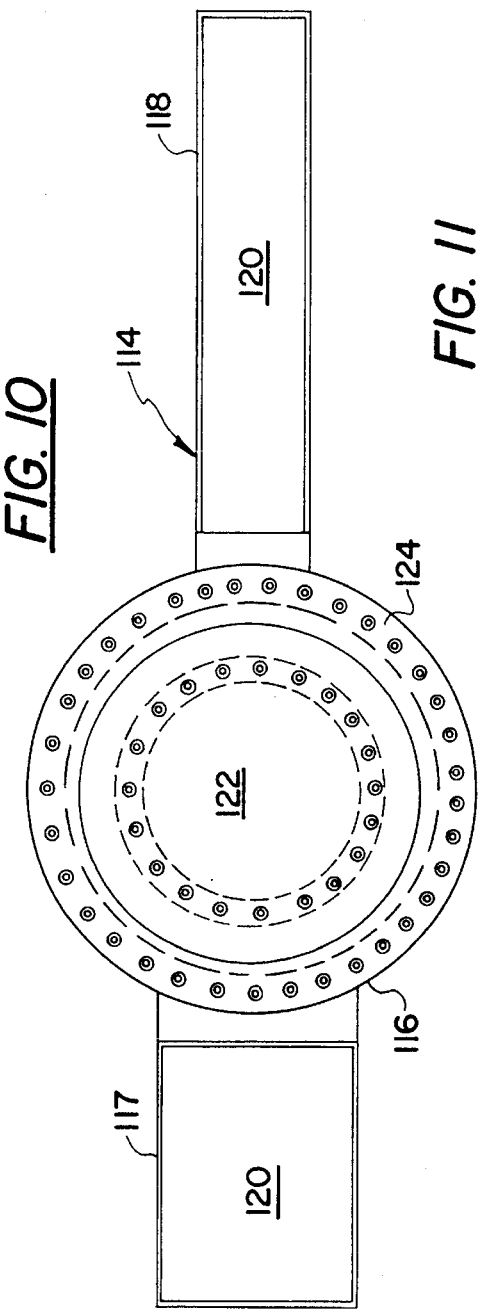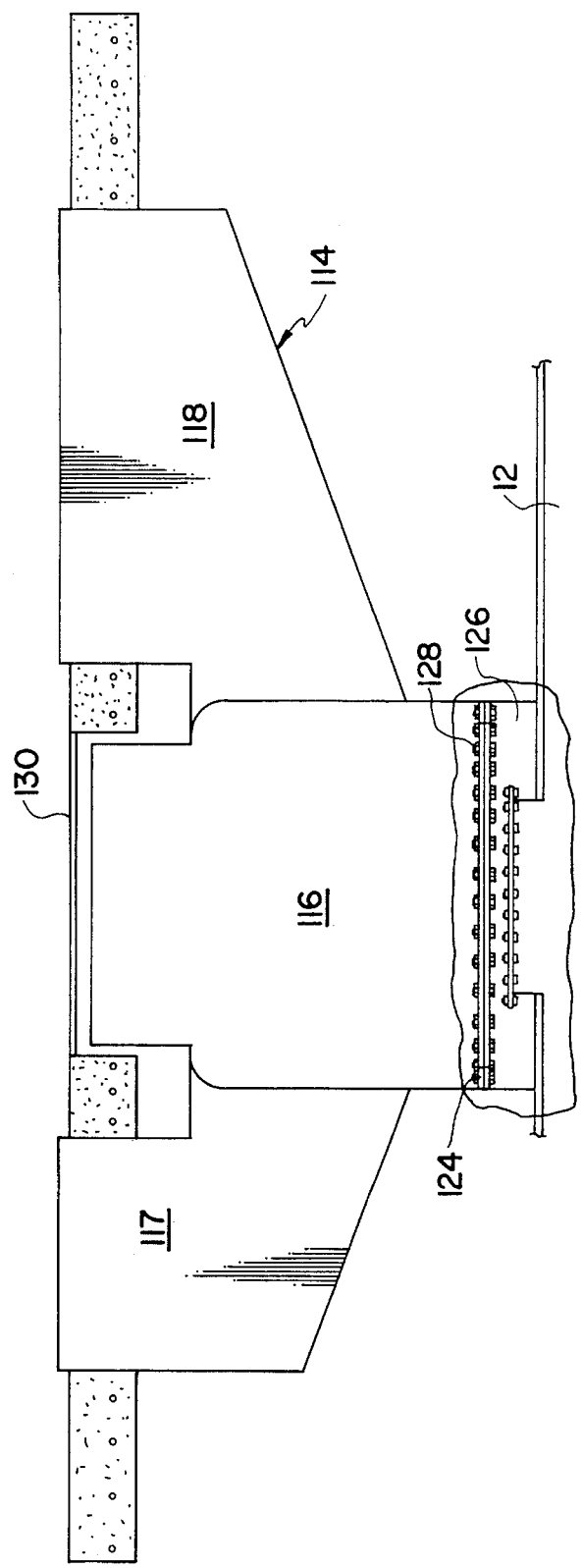

UNITIZED FUEL STORAGE SYSTEM

This application is a continuation-in-part of application Ser. No. 07/988,836 filed Dec. 10, 1992, now U.S. Pat. No. 5,390,713.

BACKGROUND OF THE INVENTION

1. Field of the Invention

The present invention relates to an underground fuel storage tank structure uniquely designed with a built-in sump portion and permanently affixed product piping lines disposed for easy connection to a dispenser. The structure is outfitted with automatic and continuous vacuum extraction of vapor and product that may accumulate within the sump portion. Access is provided to the sump portion. The system is equipped to provide Stage I and Stage II vapor recovery.

2. Related Art

Presently, there are thousands of fuel service stations located across the country. Each year many new service stations are constructed requiring underground storage tanks. In addition, existing service stations are renovated by replacing old fuel storage tanks with new tanks.

Generally, the installation of a fuel storage tank requires the removal of earth creating a deep hole large enough to place the fuel storage tank therein. Underground piping is then connected to the fuel storage tank. The underground piping is provided for filling and venting the fuel storage tank. Other piping is also attached to the fuel storage tank for distribution of its contents to a dispenser.

The fuel storage tank and associated piping are covered with compacted earth or back-fill. A traffic pad made of asphalt or concrete is constructed to support automobiles to be fueled. Finally, a concrete center isle is poured and the dispensers are attached to the underground piping to complete the construction. Upon completion, the piping protrudes through the center isle.

In conventional tank installations, there is typically little or no access to the product piping once construction is complete. Studies have shown that approximately ninety percent of all product leaks and discharges occur through the product piping, even at new installations. Consequently, leak detection devices and double walled product piping are installed during construction to ensure safety. If a leak should occur in the piping, repair can only be accomplished by jack-hammering into the traffic pad and center isle to locate the leak and repair or replace the defective piping. This method of repair can be costly, time consuming and disrupts fuel dispensing service. Underground sumps have been used to contain some of the piping. However, the sump is considered to be an explosive hazard if it is not vented. Furthermore, should a conventional tank need replacement due to a leak or contamination, the cost of replacement becomes substantial since the replacement involves the excavation of the entire old or contaminated tank and the repiping of the venting of the distribution system.

SUMMARY OF THE INVENTION

It is an object of the present invention to provide a unitized underground fuel storage tank structure that combines the strength and durability of a vessel of preferably double-walled construction with an easy to install configuration including a sump portion, a vapor vent, dispensing product piping, and a continuous sump-vapor vacuum extraction system. These features give continuous added safety and protection.

In accordance with the present invention, a tank structure is provided including a vessel having at least first and second compartments. Fill lines are coupled to the vessel providing access to fill the first and second compartments or multi-compartments of the vessel. At least one sump riser portion is coupled to the vessel and extends therefrom. At least first and second dispensing lines are disposed within the sump riser portion and penetrate the vessel. Each dispensing line extends within the vessel and within the first and second compartments. Cross-over venting structure is provided within the vessel and is constructed and arranged to provide cross-over venting between the first and second compartments.

The entire structure is connected in a unitized way so that installation directly beneath a center isle of a gas; station can be easily completed. This unitized configuration saves construction costs and installation time.

Within the sump riser portion is a sump-vapor vacuum extraction system. The fluid return structure of the extraction system preferably includes an intake vent valve having a pipe stem with an opening spaced about one quarter inch above the vessel's top surface. There is an outlet from the extraction system that opens directly into the vessel. As fuel is pumped from the vessel, the rising negative pressure therein creates sufficient vacuum to pull vapors and or liquid that might accumulate in the sump riser portion, back into the vessel. No in-line leak detector is required in the sump riser portion due to the vacuum extraction system's continuous removal of dangerous vapors and/or liquids.

A vent stack is also preferably provided as a part of the extraction system which extends vertically upward from the vessel to the atmosphere to allow positive pressure to vent.

The negative vapor pressure can also be used to incorporate a second stage (industrially described as STAGE II) vapor recovery which can be easily installed on the top of the extraction system for additional fume recovery from the gasoline tank of automobiles.

The present invention provides a unitized underground storage tank structure that requires no tie down because of its overburden (back-fill material) hold down design. The overburden hold down design prevents the underground vessel from floating when empty and fully submerged. Two hold down beams, one located at either end of the vessel aid in keeping the unitized tank structure submerged and also provide anchoring for an overhead canopy.

The present invention can be installed without additional piping because product lines and vent lines are affixed directly to the tank. After installation of the vessel, vent and dispensing lines are located within the sump riser portion directly under the fuel dispenser and vent stack connections. A manway is preferably located next to the fuel dispenser to allow a person to gain easy access to all the piping and or pump equipment within the sump riser portion in a submerged pump (pressure) installation.

The present invention ensures that the environment within the sump riser portion is intrinsically safe by removing flammable and potentially explosive vapors therefrom. The vapor/liquid extraction system first removes vapors and liquids via negative pressure created when product is dispensed from the tank. In addition, there is a continuous vortex created by the vent pipe which is connected to a vent stack which preferably extends at least twelve feet above the ground or at least higher than any adjacent structure.

The present invention vessel size preferably ranges from 1,000 to 25,000 plus gallons. The vessel can also be designed to handle more than a single product. Vessels holding more than a single product can be designed to deliver multiple products through single or multiple sumps located underneath multiple fuel dispensers.

The installation process of the present invention is relatively simple. Since the piping is unitized with the tank structure, no additional piping is required, unless two systems are used and connected together. The vessel is buried in a position directly below the designated location of a pump island. Back-fill is used to cover the vessel. No soap testing or other leak testing is required on pressure pipes of the vessel as they are installed and pressure tested and UL certified before delivery of the system. Compaction of the back-fill and a concrete pour of the pump island can be accomplished within twenty-four to forty-eight hours after beginning the installation. Fuel dispensers are installed directly above the sump riser portions. Product lines and vent stacks are connected via short lengths of flex or rigid piping.

Other objects, features and characteristics of the present invention, as well as the methods of operation and functions of the related elements of the structure, the combination of parts and the economics of manufacture, will become more apparent upon consideration of the following detailed description and appended claims with reference to the accompanying drawings. In the drawings like structure is referenced by like reference numerals, all of which form a part of this specification.

BRIEF DESCRIPTION OF THE DRAWINGS

FIG. 10 is a plan view of a riser portion of a unitized tank structure of the invention;

FIG. 11 is a side elevational view of the riser portion of FIG. 10 mounted to a vessel;

DETAILED DESCRIPTION OF THE INVENTION

With reference to the drawings, a unitized tank structure, generally indicated at 10 and provided in accordance with the present invention, is shown. It is understood and appreciated that, although the invention is illustrated as an underground tank structure for the storage of gasoline, the invention can be used for a wide variety of liquids and can be installed in a variety of locations.

Figure 1:
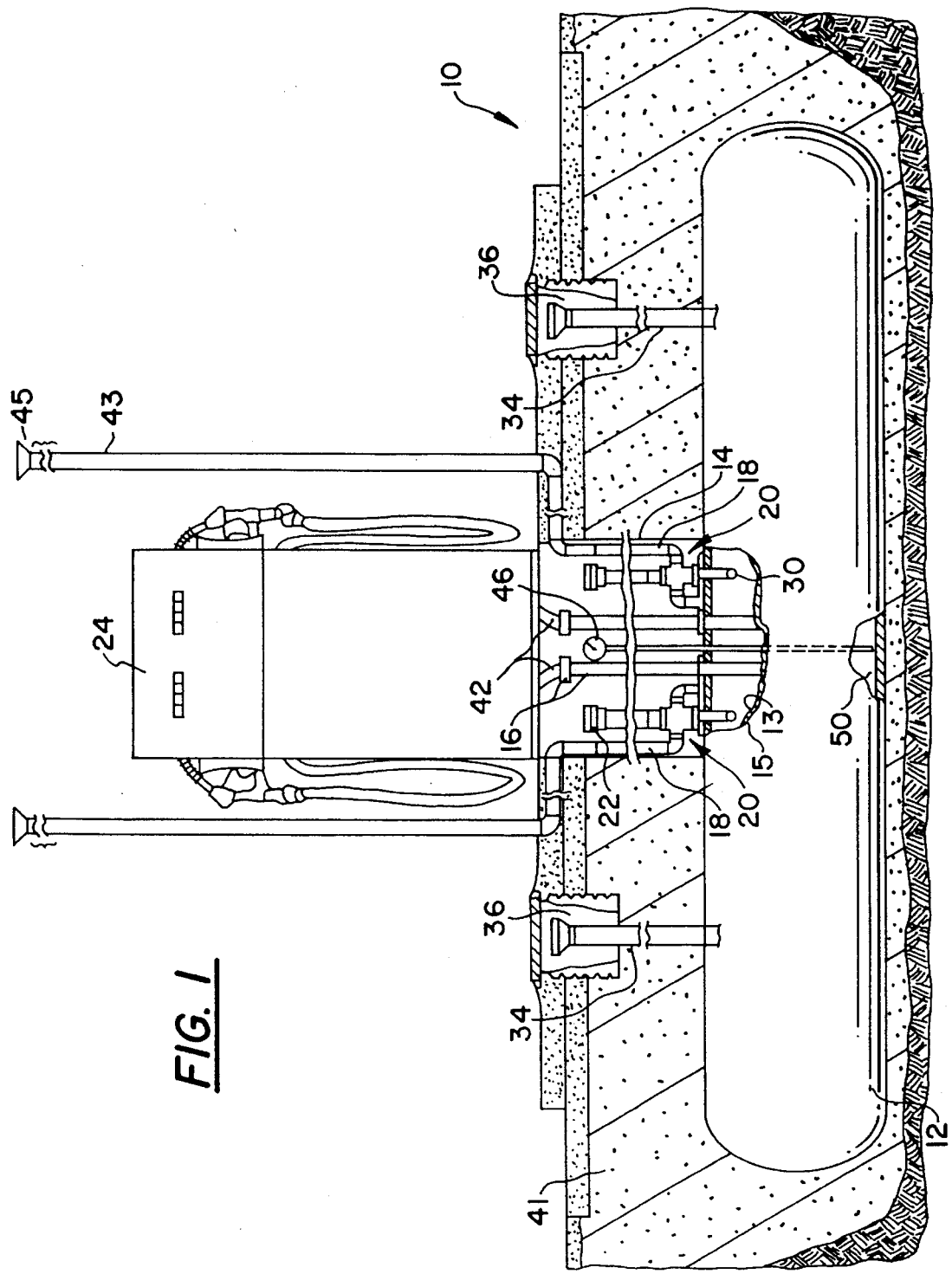
FIG. 1 is an elevational view of the present invention installed in the ground with a commercial suction fuel dispenser for two products attached thereto.
Figure 2:
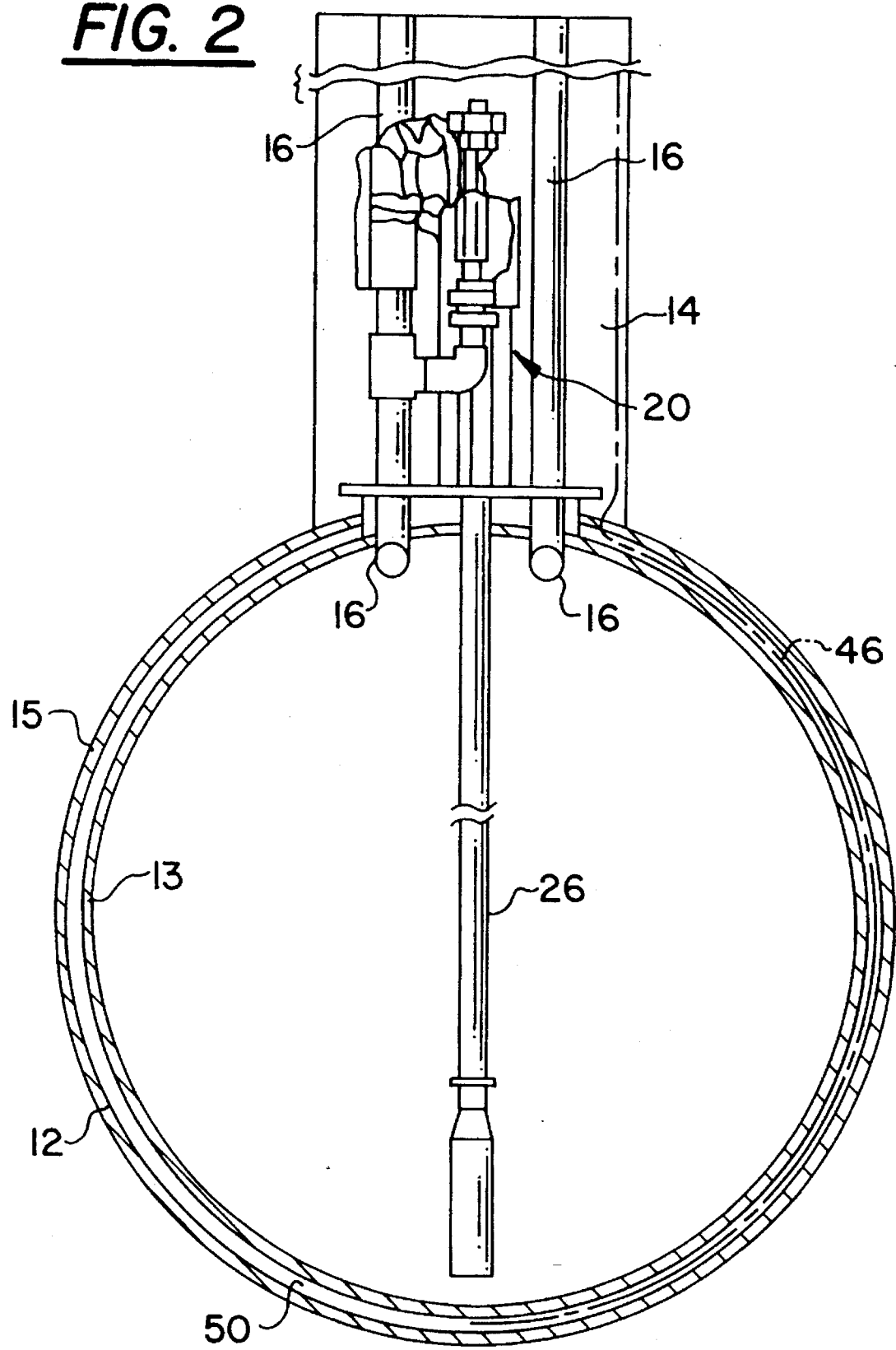
FIG. 2 is an elevational side view of the present invention with an extraction pump located within the sump riser portion.

As shown in FIG. 1, the unitized tank structure 10 includes a vessel 12 that preferably has a conventional double-walled construction, having inner wall 13 and outer wall 15, as is shown in FIGS. 1 and 2. A sump riser portion 14 is coupled to the top of the vessel 12 such that the bottom edge of the riser portion 14 embraces the vessel 12. Dispensing lines 16 and 17, for dispenser 24, are disposed within the riser portion 14. Dispensing lines 16 and 17 penetrate the vessel 12 and extend downwardly into the vessel so extraction of fluid within the vessel, either by suitable pumps or suction apparatus, can be accomplished. Also disposed within the riser portion 14 are vapor vent lines 18, a sump/vacuum extraction system, generally indicated at 20, and optional secondary stage vacuum lines 22.

Figure 3:
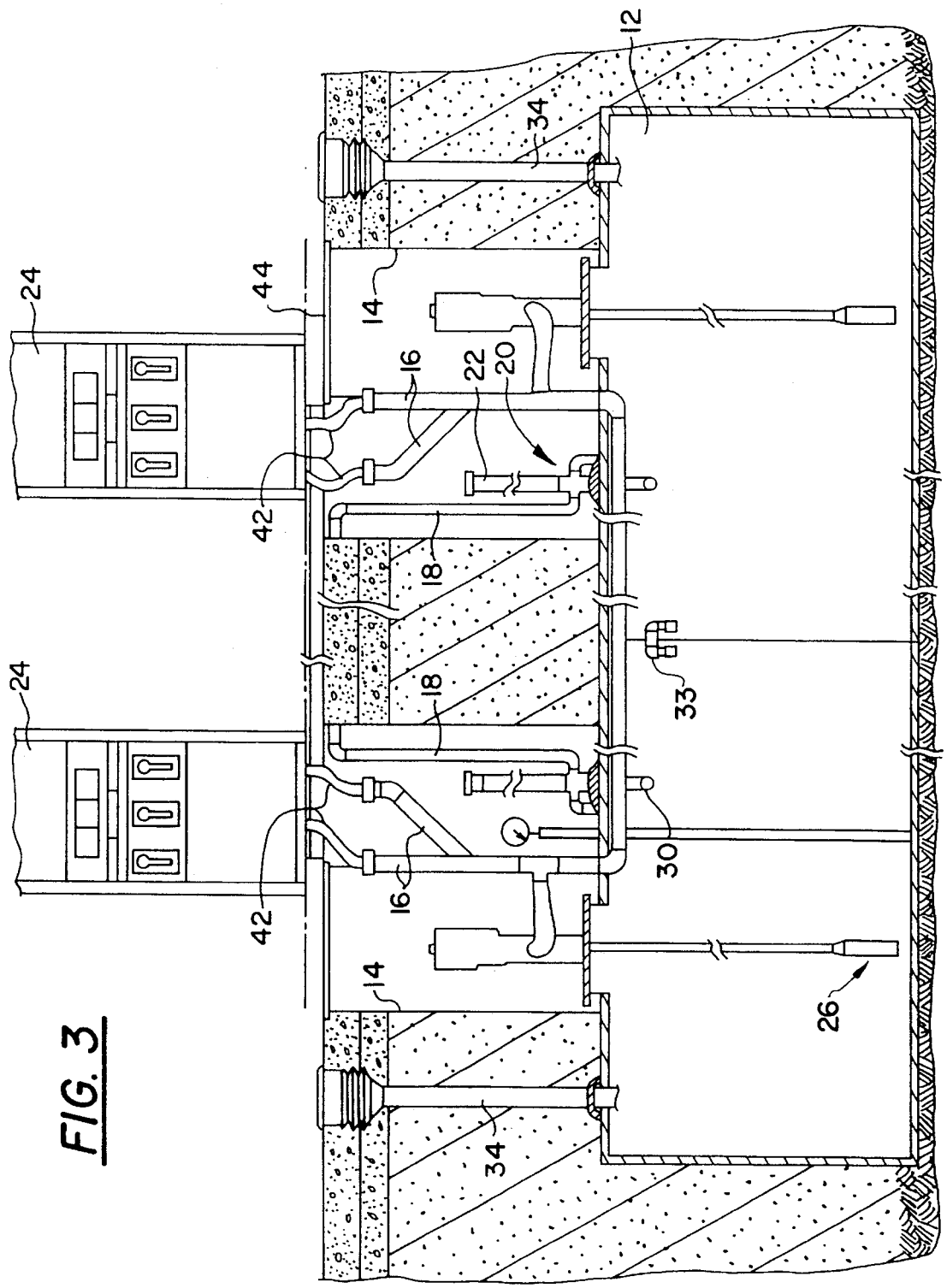
FIG. 3 is an elevational view of the present invention having multiple dispensers and a multi-compartment vessel shown installed in the ground.
Figure 5:
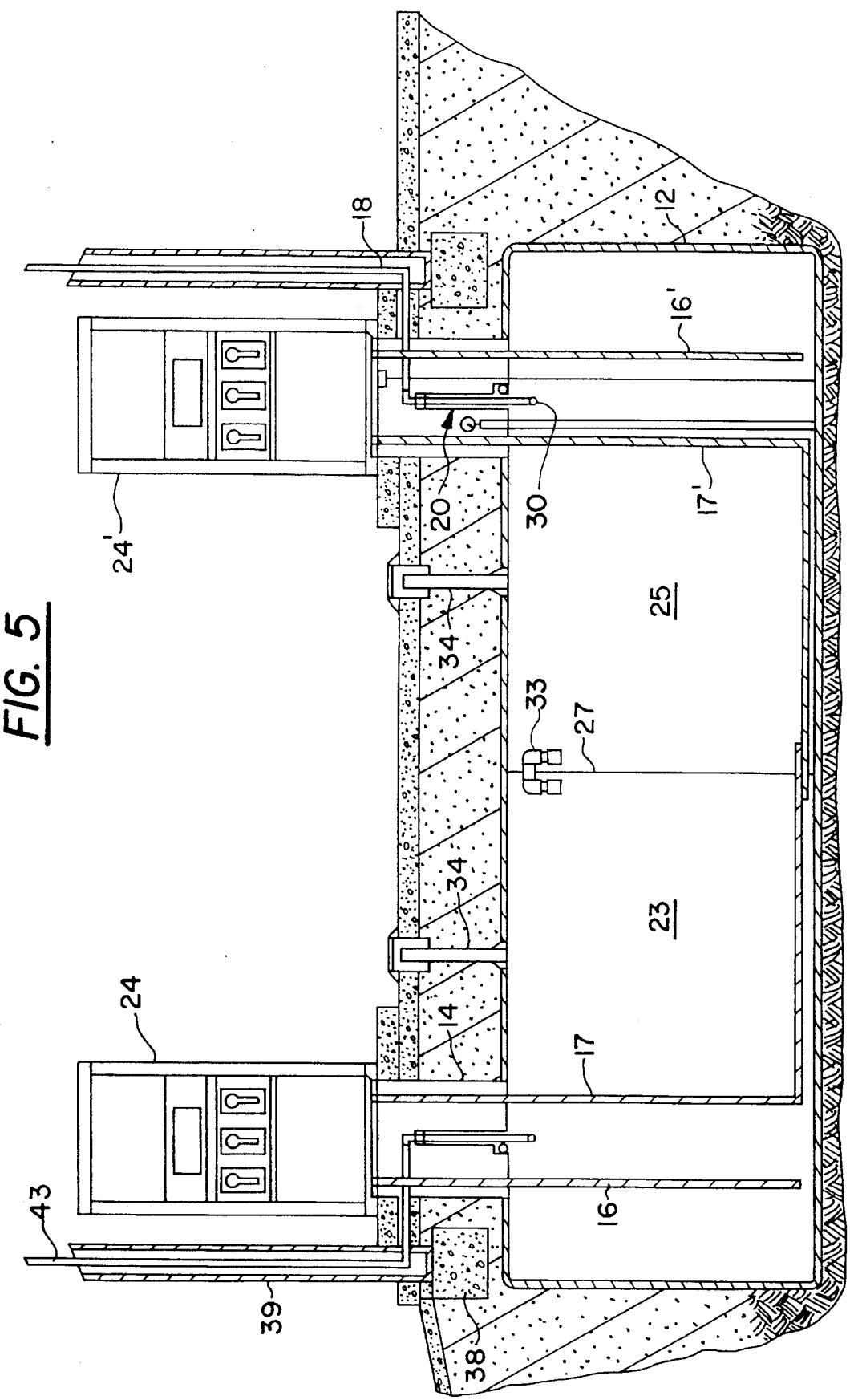
FIG. 5 is an elevational view of a the present invention installed in the ground shown with multiple fuel dispensers and suction product piping attached thereto.
Figure 6:
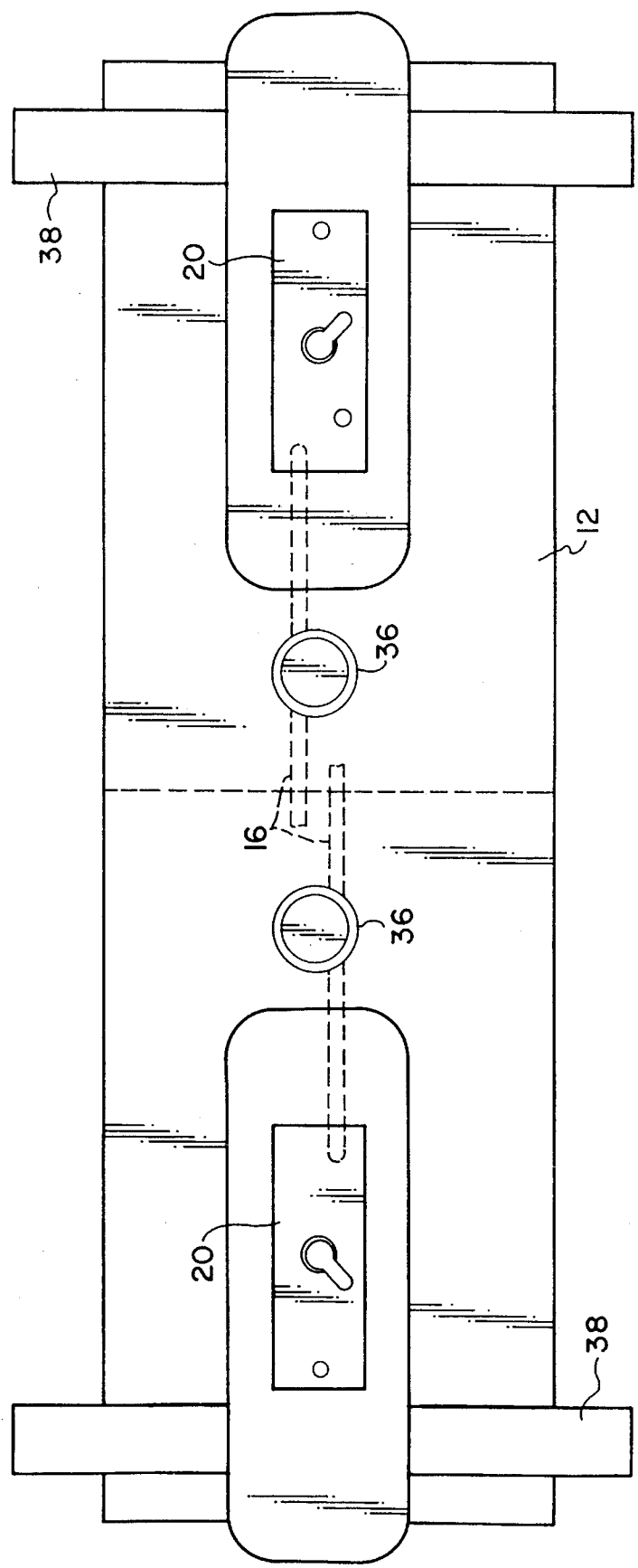
FIG. 6 is a top view of the present invention showing the sump riser portion and spill containment portions of a multiple dispenser installation.
Figure 7:
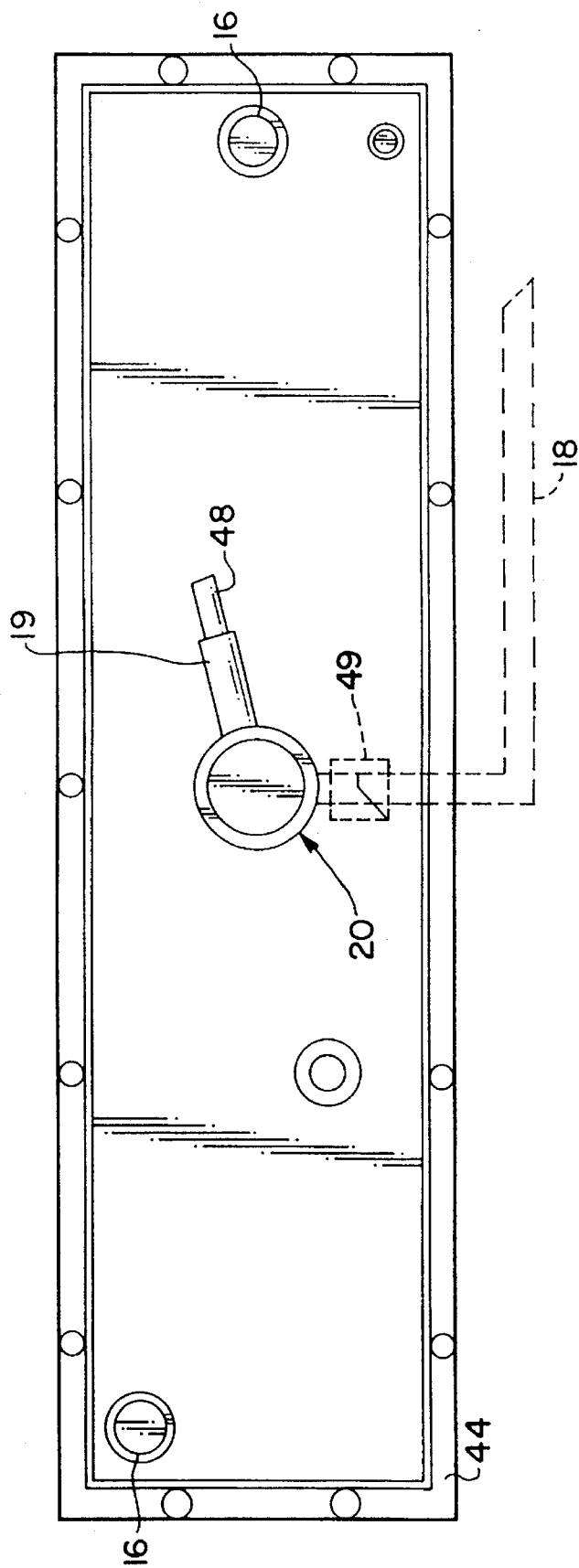
FIG. 7 is a top view of the sump riser portion provided in accordance with the present invention.

The dispensing lines 16 and 17 extend from the top of the riser portion 14 to near the bottom of the vessel, penetrating the vessel 12 at the top thereof, within the riser portion 14. In large vessel configurations, an optional pump 26 may be installed which extends to the bottom of the vessel and is coupled to the dispensing lines 16 at an opposite end thereof (FIG. 3). Should the vessel 12 have multiple sections as shown in FIGS. 3 and 5 at 23 and 25, dispensing lines 16 and 17 are provided for dispensing fluids from within those separate compartments of the vessel 12. Generally, fluids are removed by a vacuum pump disposed within a dispenser 24. As shown in FIG. 5, when multiple fuel dispensers 24 or 24' are provided, each dispenser 24 and 24' includes a blending valve. Thus, two products can be mixed to provide three product availability. For example, if gasoline is being dispensed, 87 and 92 or 93 Octane gasoline can be blended to provide 89 Octane gasoline. The 87 Octane gas being in vessel portion 23 and the 93 Octane gas being in vessel portion 25.

Thus, as shown in FIG. 5, the vessel portion 23 is isolated from vessel portion 25 via a partition wall, designated by numeral 27. For blending to occur at dispenser 24, dispensing line 17 enters the first vessel portion 23, but, as shown, extends through partition wall 27 and into open communication with vessel portion 25 to bring the 93 Octane or 92 Octane gas, held in vessel portion 25, to dispenser 24. Dispensing line 16 also enters vessel portion 23, as shown, and provides direct access to the 87 Octane, held in vessel portion 23, thus providing a way to bring 87 Octane to dispenser 24. As shown, the other dispenser 24' has a similar cross-over piping arrangement shown at 16' and 17'.

Figure 8:
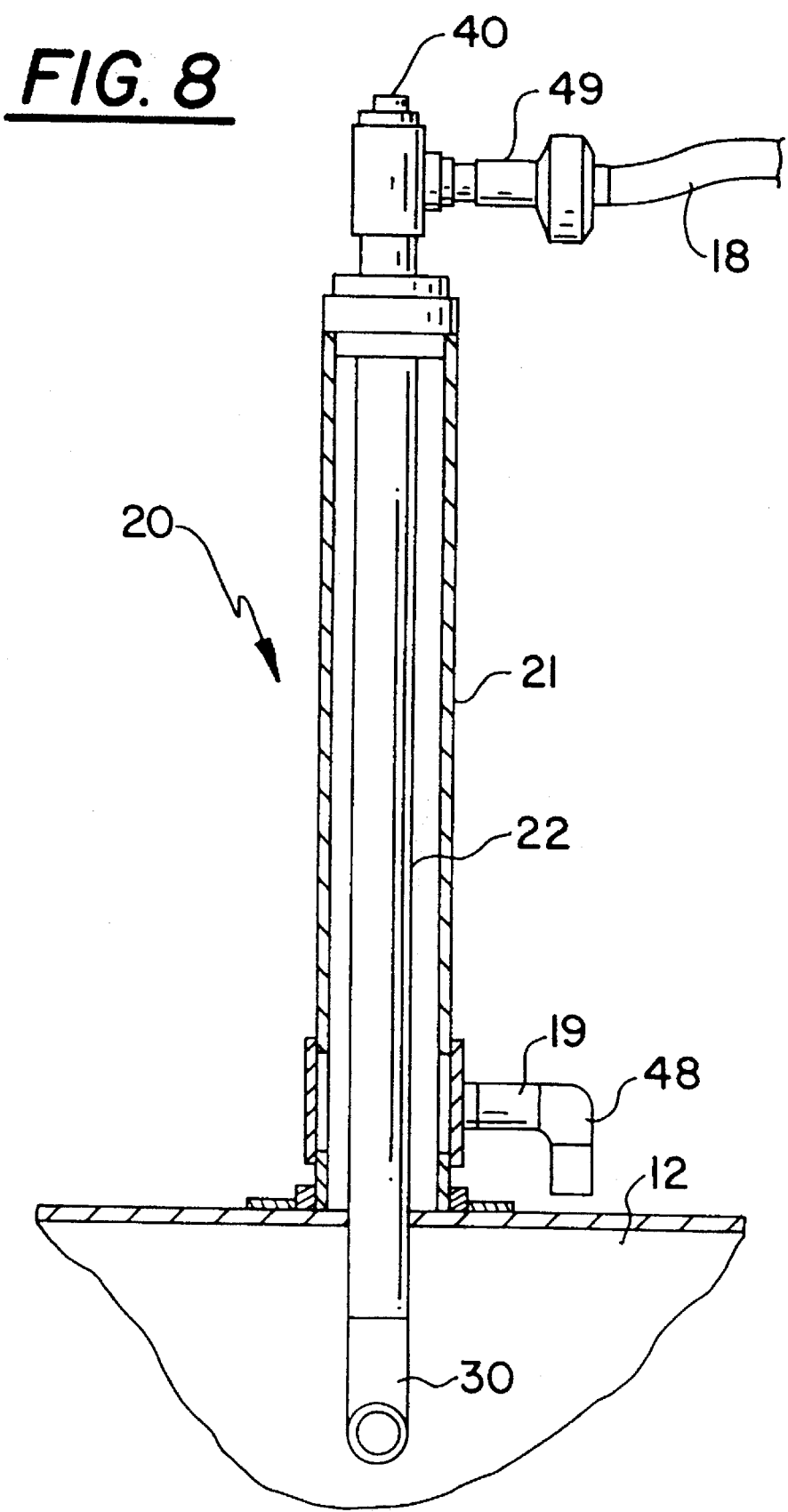
FIG. 8 is an enlarged view of the extraction system provided in accordance with the principles of the present invention.

Vapor vent lines 18, also located within the riser portion 14, vent positive vapor pressure that may build up within the vessel 12 out to the atmosphere. Each vapor vent line 18 is coupled to the a sump/vacuum extraction system 20 via check valve 49 and riser pipe 21 (FIG. 8). The sump/vacuum extraction system 20 is coupled to the vessel 12. The extraction system 20 is disposed within the riser portion 14 and includes a overfill vent valve 30 coupled to vent line 22, which extends into the vessel to stop fluid from exiting the vessel via the extraction system 20. Also included in the extraction system 20 is a pipe stem 48 having an opening spaced about one quarter inch above the vessel's top surface. A check valve 19 is coupled to the pipe stem. The check valve 19 is affixed to a riser pipe 21. As fuel is pumped from the vessel 12, the rising negative pressure within the vessel creates sufficient vacuum to pull vapors and/or liquid that may have accumulated in the riser portion 14 back into the vessel 12.

Figure 14:
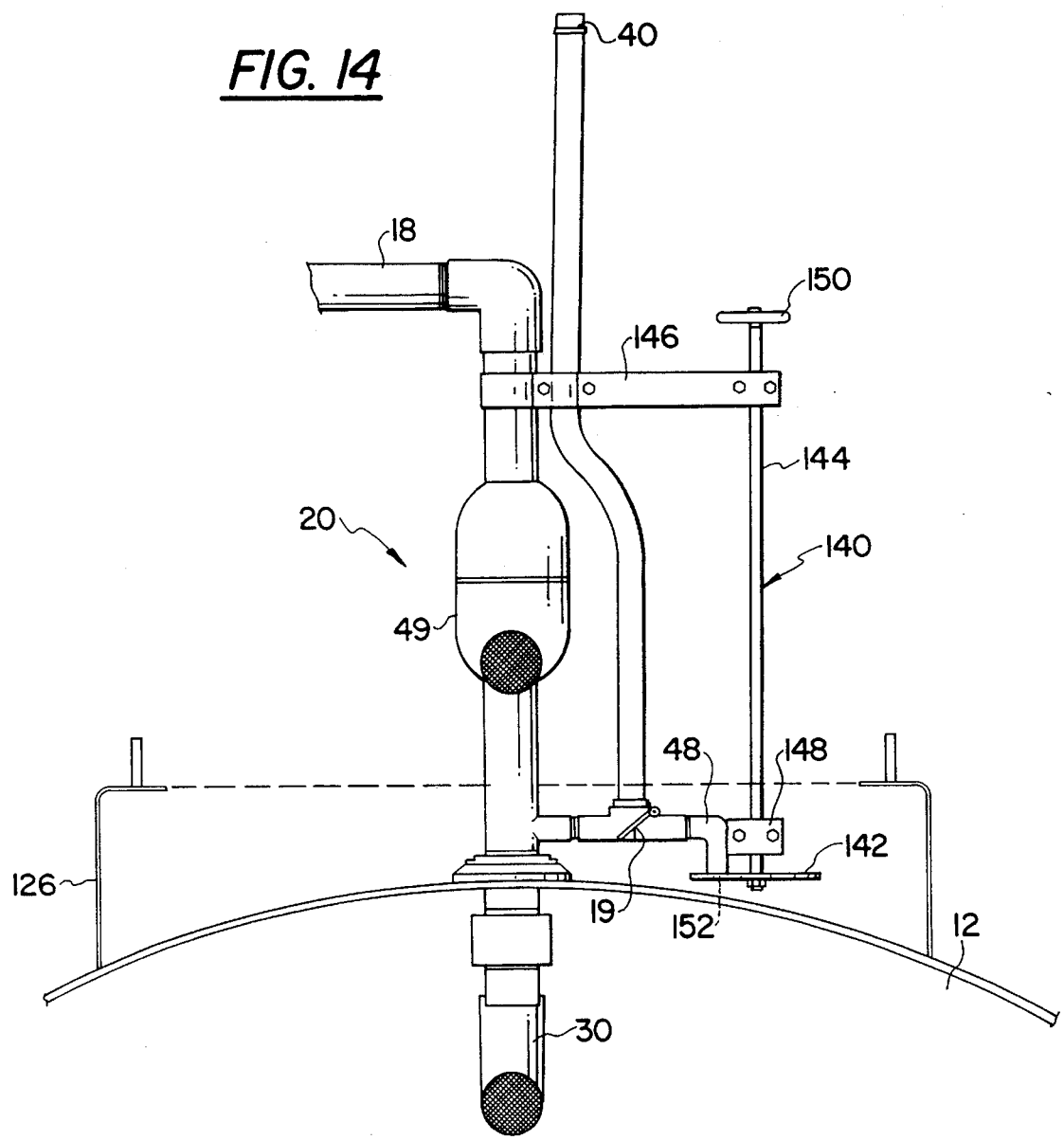
FIG. 14 is an enlarged view of a valve assembly for controlling vacuum created by the vacuum extraction system.
Figure 15:
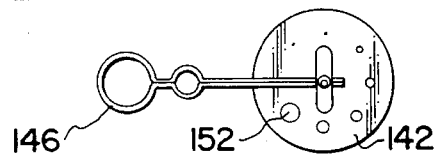
FIG. 15 is view of the valve member and bracket of the valve assembly of FIG. 14.

A modified extraction system 20 is shown in FIG. 14 which includes a valve assembly, generally indicated at 140. The valve assembly 140 comprises a rotary valve member 142 coupled to a distal end of an actuator or rod 144. The rod 144 is mounted to piping via brackets 146 and 148 at each end thereof, such that the rod 144 may rotate with respect to the fixed brackets. The proximal end of the rod 44 includes a handle 150. As shown in FIG. 15, the valve member includes a plurality of bores 152 spaced circumferentially in the valve member 142, which increase gradually in diameter. As shown in FIG. 14, the bores 152 are arranged to align with an opening in pipe stem 48. By manually moving the handle 150, the valve member 152 can be rotated to align a selected bore 152 with the opening of pipe stem 48 to selectively regulate the vacuum for returning vapor or fuel back into the vessel 12, as described above.

Optional secondary stage vapor recovery (Stage II Vapor Recovery) may be included in the extraction system 20 for the return of fumes into vessel 12 as fuel is being dispensed from the dispenser 24 into an automobile or other fuel tank, by adding a reducer or connector to pipe end 40 and coupling pipe end 40 to the dispenser 24. Thus, when dispensing fuel from the dispenser 24, approximately 90–95% of the vapors being displaced in the fuel tank are returned to the storage vessel 12 under balance of fuel being dispensed from the vessel 12. Thus, negative pressure returns the vapors to the storage vessel during Stage II Vapor Recovery. Further, as the dispenser 24 is shut down, a vortex created in the vent pipes 18 will cleanse the riser portion 14 continuously and automatically so that the riser portion 14 is made intrinsically safe. It can be appreciated that both vapors from the fuel tank of the automobile and vapors within the riser portion are returned to the storage vessel 12 with the extraction system 20 of the invention.

Figure 9:
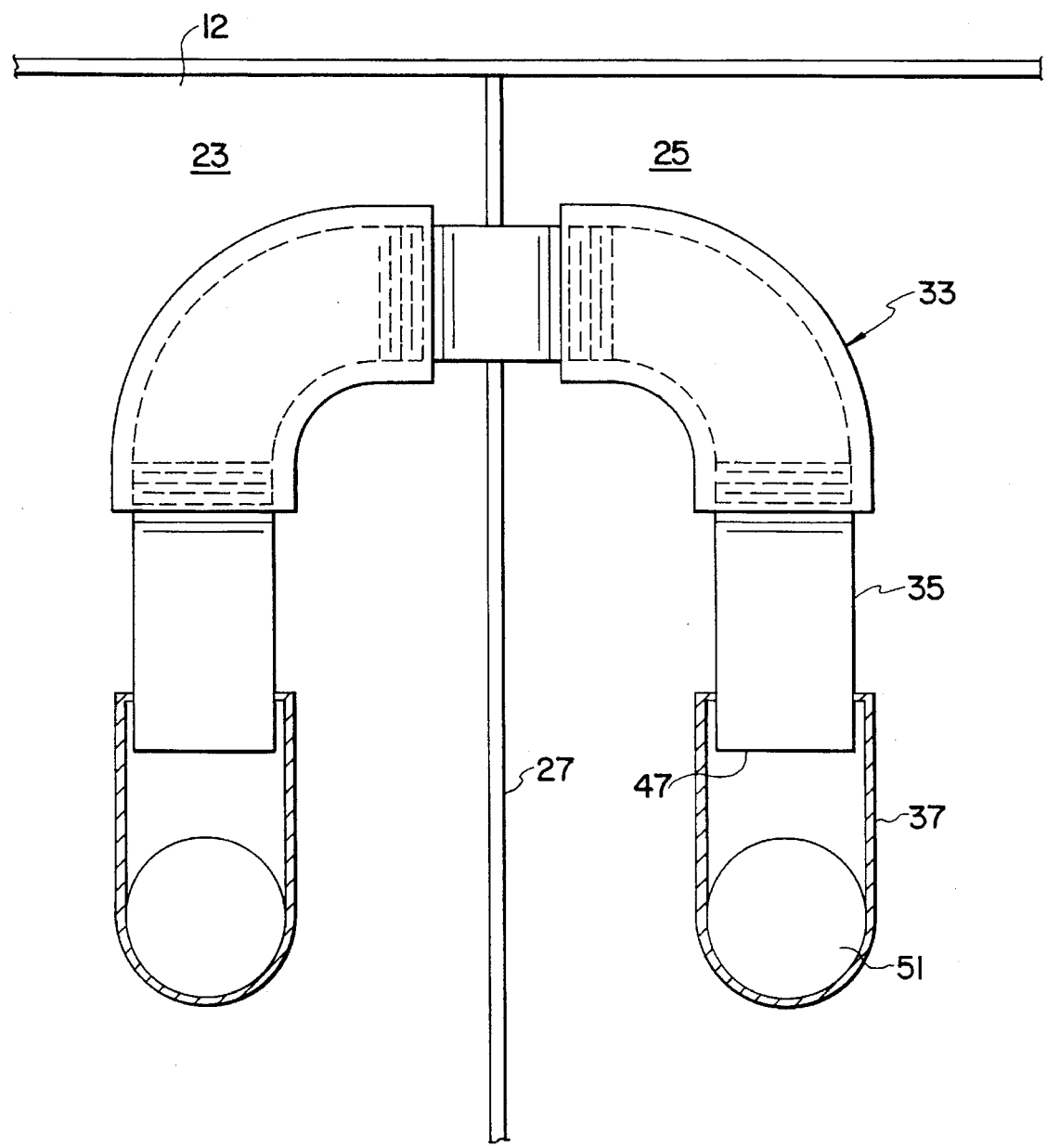
FIG. 9 is an enlarge view of a cross-over vent assembly mounted to a partition wall of a vessel, provided in accordance with the invention.

When the storage vessel 12 has multiple compartments, for example, as shown in FIG. 5, a cross-over vent structure 33 is provided. As shown, the cross-over vent structure 33 is coupled to partition wall 27 between compartments 23 and 25. FIG. 9 shows an enlarged view of the cross-over vent structure 33, which is generally U-shaped having a central portion 39 fixed to and extending through he partition wall 27. Each depending leg 35 of the structure 33 includes a float ball valve 37. When dispensing fuel from dispenser 24 via line 17, pressure between the two compartments 23 and 25 must balance. Thus, with the balls 51 of the valves 37 in a normal position (FIG. 9), the cross-over vent structure 33 permits pressure balance in the vessel 12. Cross-contamination is prevented by the ball valves 37. These valves are conventional devices each having a ball 51 which floats and seals opening 47 in an associated depending leg 35 upon a vessel overfill condition.

Fill lines 34 are attached to the vessel 12 and used to fill the vessel or vessel compartments, as shown in FIG. 1. The fill lines 34 have overfill containment members 36 for containing fuel that may splash while filling vessel 12, or leak (after the filling is completed) from the fill hose upon disconnection thereof.

Figure 4:
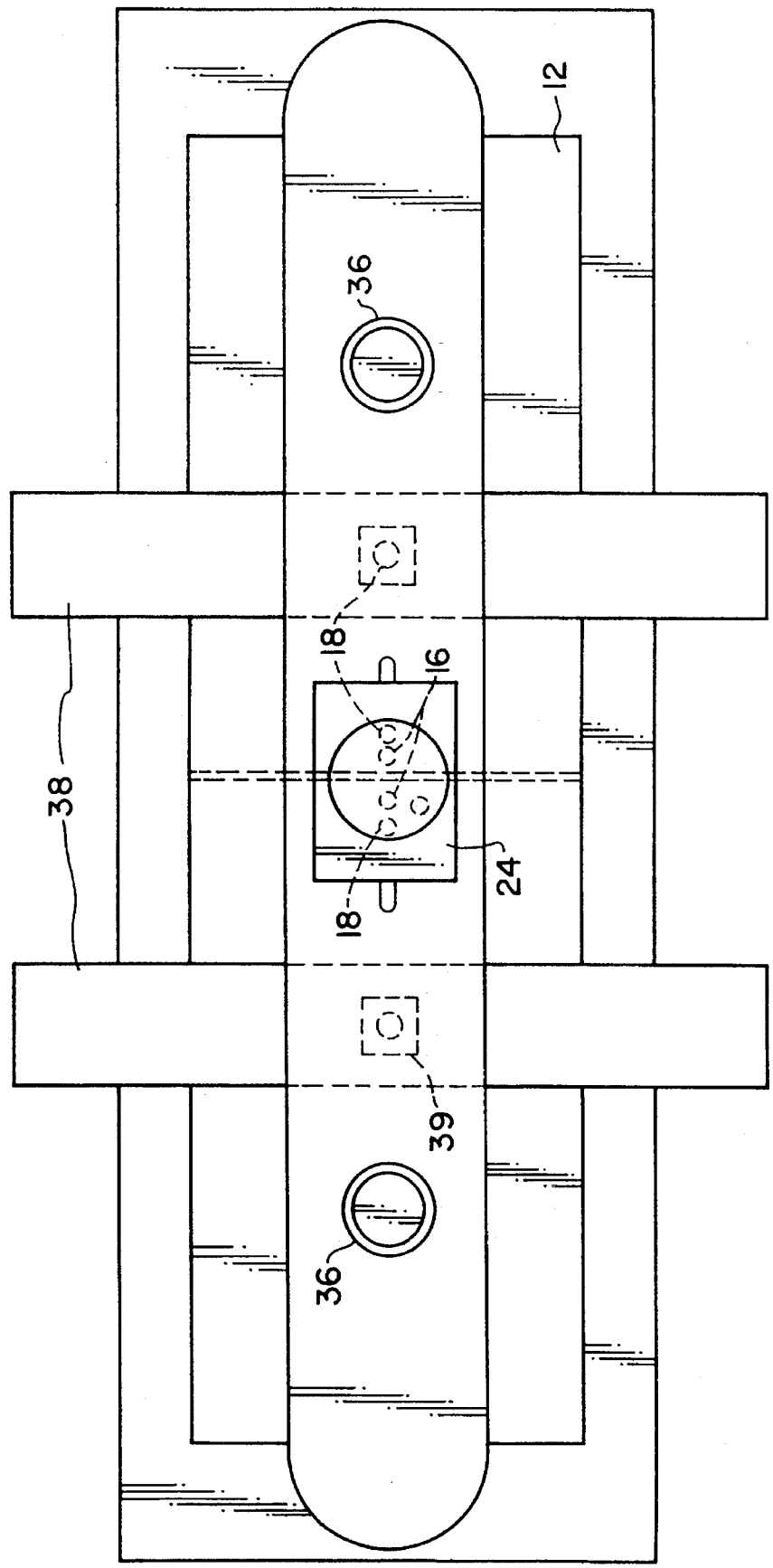
FIG. 4 is a top view of the present invention showing a multiple compartment vessel with a single sump riser portion.
Figure 12:
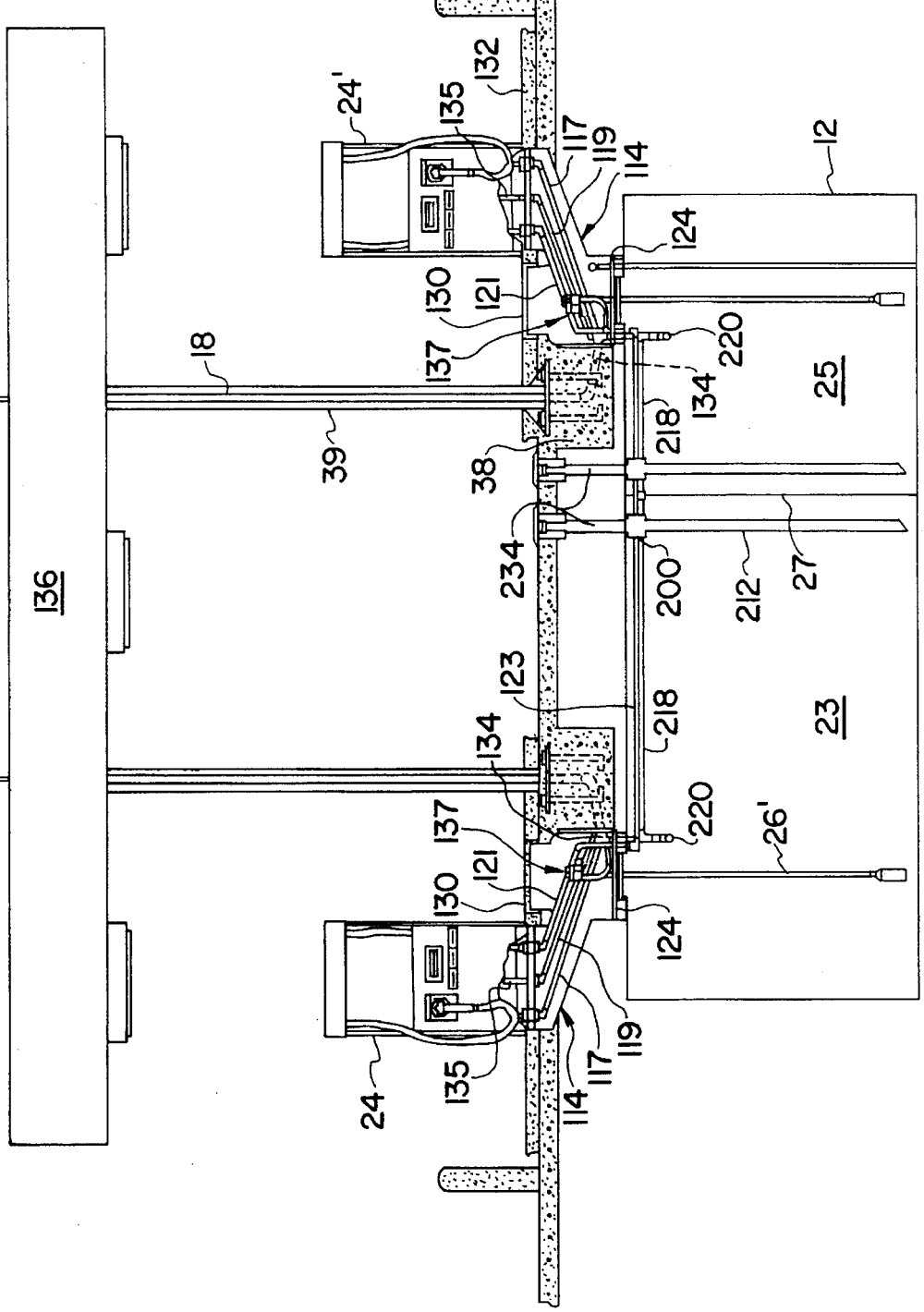
FIG. 12 is a schematic view of a unitized system incorporating a riser portion in accordance with the invention.

The unitized tank structure 10 preferably includes a canape hold down beam 38 and column 39 (FIGS. 4 and 5) for overburden tank (buoyancy) flotation and anchorage and to support an optional overhead canopy (FIG. 12).

The unitized tank structure 10 is preferably placed in the ground as a single unit with sufficient back-fill 41 or other conventional covering techniques being used to cover the tank structure. The riser portion 14 is located directly under the designated location for the fuel dispenser 24. This arrangement permits easy and proper connection of the dispenser 24 and access to the dispensing lines 16 housed within the riser portion 14.

It should be understood that multiple riser portions 14 can be included in the unitized tank structure 10 so that multiple fuel dispensers 24 can be mounted thereabove, as shown in FIGS. 3 and 5. A riser portion 14 can also be incorporated around the fill lines.

The unitized tank structure 10 of the present invention requires only the simplest of additional piping, such as flex hoses 42 used to connect dispensing lines 16 to dispensers 24, and vapor vent lines 18 to vent stack assembly 43, to complete the installation. As shown in FIG. 1, the vent stack assembly includes a vacuum/pressure vent valve 45. A check valve or rain cap can also be used in place of the vent valve 45.

In pressure system having submersible pumps, a man hole cover 44 (FIG. 3) is installed next to each dispenser 24 above the riser portion 14 for easy access to all piping within the riser portion 14. Additionally, a vacuum monitoring gauge 46 is preferably provided within the riser portion 14 and extends into the annular interstitial space 50 between the double walls of the vessel 12. The gauge 46 monitors leaks in compliance with government regulations which may occur in the double walled vessel. Various sensors may be used in place of monitoring gauge 46. For example, liquid sensors, hydrocarbon sensors, and hydrostatic sensors (used in fiberglass vessels only) may be employed.

Figure 18:
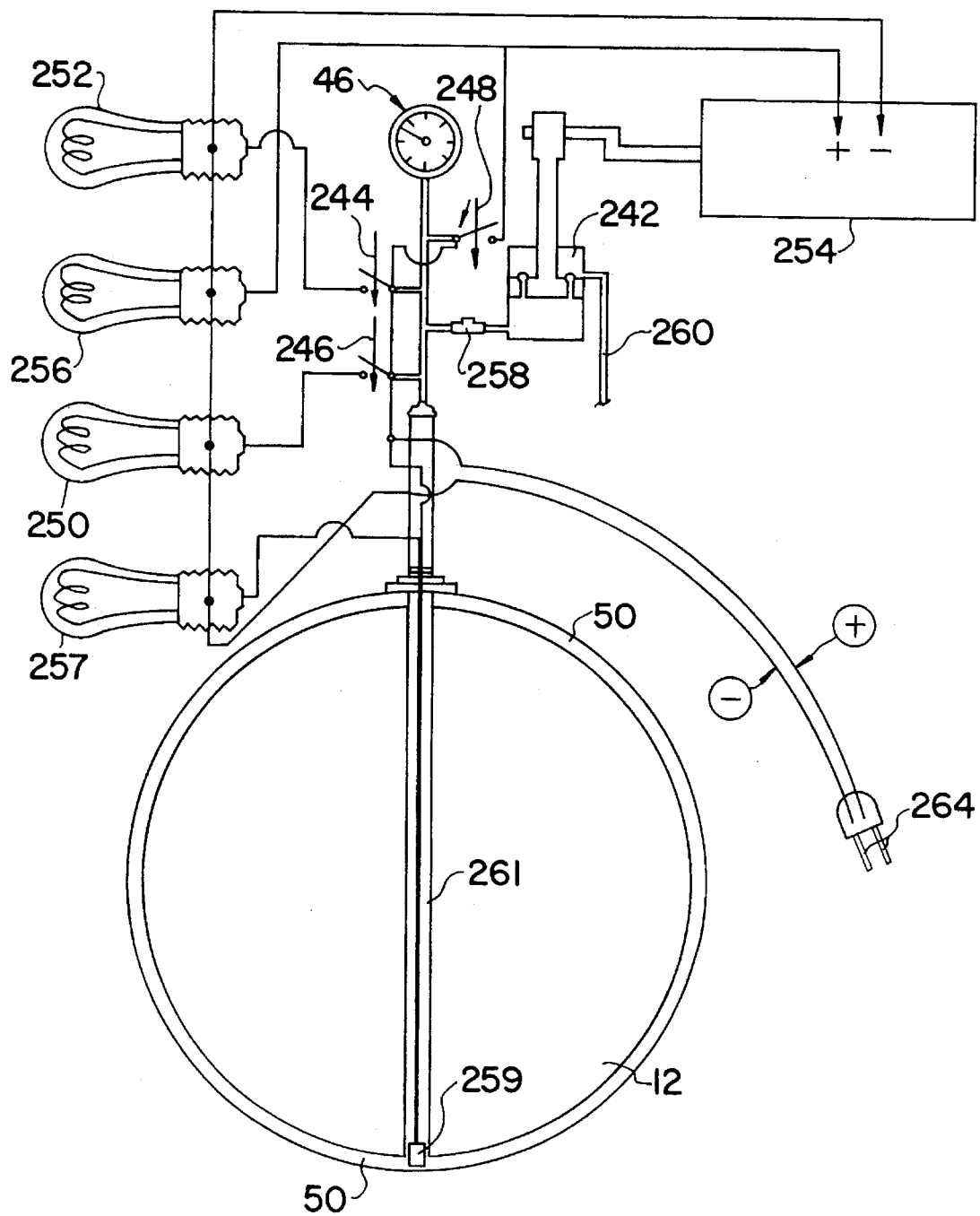
FIG. 18 is an enlarged schematic view of a vacuum monitoring system provided in accordance with the principles of the present invention.

FIG. 18 shows schematically a vacuum monitoring system 240, provided in accordance with the invention, which includes a vacuum pump 242 to maintain a vacuum anywhere between zero and fourteen plus inches of mercury. The system 240 includes three pressure switches 244, 246 and 248, for monitoring vacuum. It can be appreciated that one pressure switch may be provided with a microprocessor in lieu of the three pressure switches. Switch 246 activates a visual indicator such as a red warning light 250 when the vacuum is below approximately 4.9 inches of mercury indicating vacuum leak. A green monitoring light 252 illuminates when the vacuum is between five inches of mercury and a high end value of approximately fifteen plus inches of mercury, and indicates that the vacuum level is proper. If the vacuum drops below five inches of mercury, the vacuum pump 242 is activated until the vacuum reaches fifteen plus inches mercury. The high vacuum setting is determined by the tank manufacturer guidelines. When the vacuum pump 242 is activated, a yellow light 256 will illuminate to so signal an operator that the pump 242 is maintaining or replenishing the required vacuum. The system monitors vacuum in the interstitial space 50. Gauge 46 extends through pipe 261 to the interstitial space 50. The system 240 ensures that the leakage of the vessel 12 is within the federal guidelines of less than 0.100 gallon leakage per hour. The system 240 also includes a check valve 258 to maintain vacuum in interstitial space 50 and to enable one to access the vacuum pump 242. A vacuum and/or product discharge pipe 260 is connected to the inner tank of vessel 12. A blue light 257 is provided to signal the presence of liquid, water and/or fuel in the interstitial space 50 sensed by float sensor 259. An electrical connection 264 powers the system 240.

Figure 17:
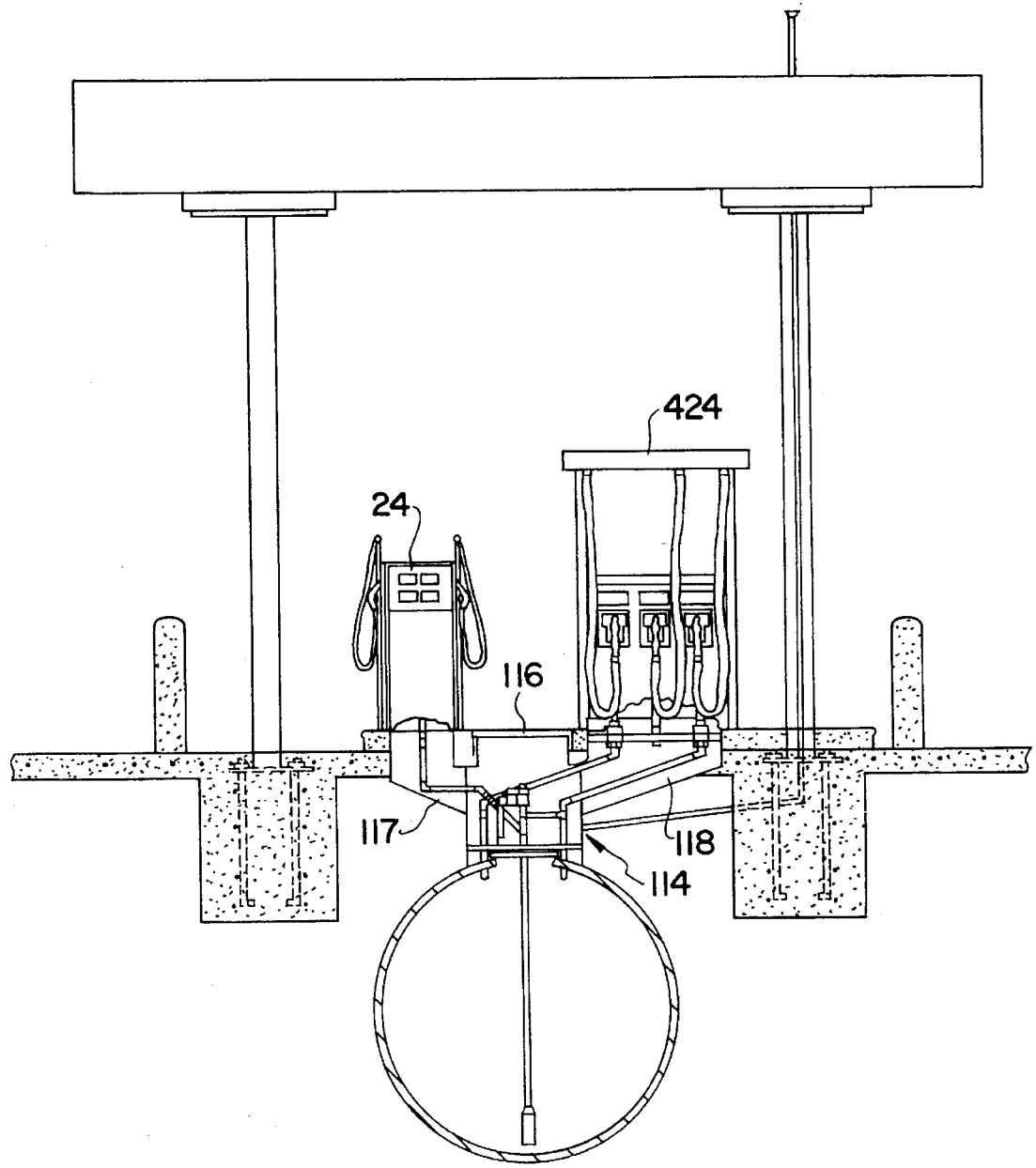
FIG. 17 is a schematic view of a unitized multi-product system incorporating the riser portion of FIG. 11.

With reference to FIGS. 10 and 11, it is within the contemplation of the invention to provide a one-piece molded sump riser portion 114, preferably molded from a plastic material, such as cross-linked polyethylene. As shown, the sump may comprise three different sections: a main or generally cylindrical portion 116, and two generally rectangular arm portions 117 and 118 extending from the cylindrical portion 116 in opposite directions. The mold is of "knock-down" type wherein three different versions of the sump portion 114 may be provided. For example, cylindrical portion 116 and arm portion 118 may be provided for use with a typical fuel dispenser, or portion 116 and arm portion 117 may be provided for a commercial two hose pump/ dispenser arrangement, or, as shown in FIG. 17, the cylindrical portion 116 and both arm portions 117, 118 may be provided when both a suction dispenser 24 and commercial two hose pump/dispenser 424 are required. Each arm portion 117, 118 includes a hollow chamber 120 which is in open communication with chamber 122 of the cylindrical portion 116, the function of which will become apparent below. A seal ring 124 is provided for sealingly coupling the riser portion 114 to flange 126 extending from vessel 12. Flange 126 includes a plurality of threaded rods 128 extending upwardly therefrom which are used to couple the seal ring 124 and thus the riser 114 to the flange 126. A rain-tight cover 130 closes the open end of the cylindrical portion 116.

Figure 13:
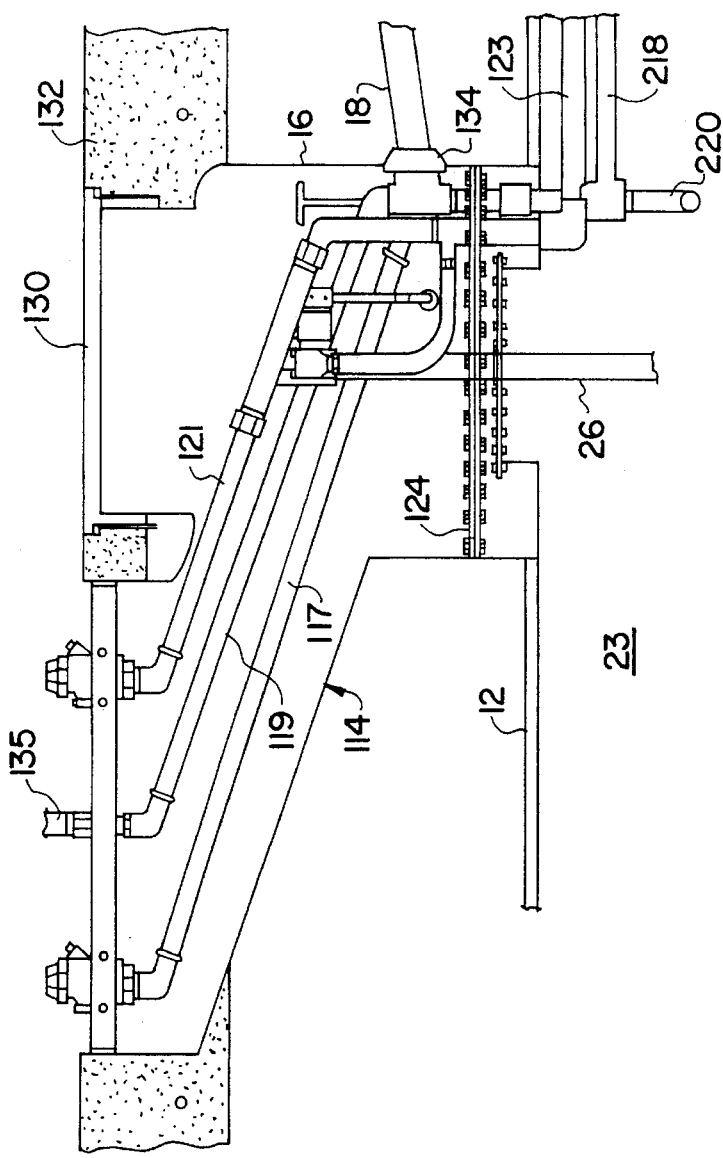
FIG. 13 is an enlarged view of the piping arrangement within the riser portion of the system of FIG. 12.
Figure 12A:
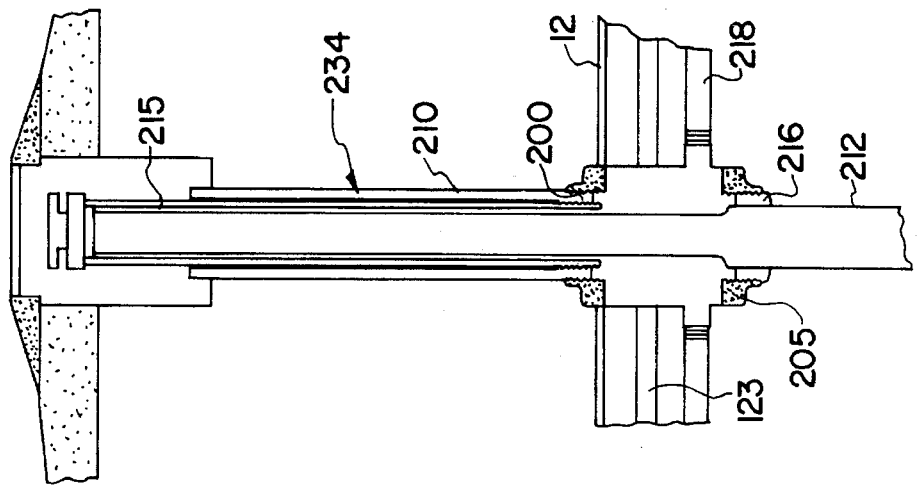
FIG. 12a is an enlarged schematic view of the fill piping of the system of FIG. 12.

FIG. 12 shows schematically, an installation of a pair of risers 114 (comprising cylindrical portion 116 arm portion 118) equipped with Stage I and II Vapor Recovery. One riser is associated with dispenser 24, while a second riser 114 is associated with dispenser 24'. As shown, a dispenser 24 or 24' is disposed directly above the arm portion 118 of each riser 114. The dispensing lines 117 and 121 and Stage II vacuum vent line 119 are coupled to the dispenser 24' and extend within cavity 120 of the arm portion 118 of the riser 114 and into the cavity 122 of the cylindrical portion 116. A pump 137 is associated with each dispenser 24 and 24' for extracting fuel from the vessel 12. A hole 134 is provided in the cylindrical portion 116 of the riser 11.4 to provide access for vent piping 18. Each dispenser is equipped for Stage II Vapor Recovery at pipe 135 coupled to vent line 119. Thus, vapors created during dispensing of fuel may be returned to the vessel 12 via vent line 119, as best shown in FIG. 13. The fill lines 234 are constructed and arranged for Stage I coaxial and/or dual point vapor recovery so as to return vapor to the vessel 12 and tanker truck (via coaxial fill hoses, as explained below) during filling of the vessel 12. As best shown in FIG. 12a, each fill line 234 is coupled to the vessel via a dielectric bushing 200. Preferably, a four-inch diameter sleeve 210 is coupled to the bushing in such a manner to surround the steel fill tube 212. Thus, the sleeve 210 provides secondary containment around a portion of the steel fill tube 212, ensuring a corrosion free environment and dielectrically isolating the steel fill tube and the vessel.

The fill lines 234 are constructed and arranged with cross-over venting structure for venting between the two compartments, and are dielectrically isolated. Each fill tube 212 is disposed coaxially with the sleeve 210 and has a neck 214 with a diameter slightly less than the diameter of sleeve 210 so as to define a space 215 therebetween. This arrangement permits Stage I Vapor Recovery to the tanker truck via space 215 during filling of the vessel 12. Fix couplings 200, 216 fixes the fill tube 212 to the coupling 205 so that the fill tube 212 extends from the sleeve 210 in sealed relation therewith. The cross-over venting structure includes a pipe 218 extending through partition 27 and into each compartment 23 and 25 in open communication therewith via conventional overfill ball vent valves 220 coupled to ends thereof. As shown in FIG. 13, piping 218 is in communication with vent lines 119 and 18. Thus, with this arrangement, when filling the vessel 12, vent vapors can be returned to the vessel easily through line 218 via the overfill ball vent valve 220. It can be appreciated that the fill lines could be used as a single point and a dual point Stage I vapor recovery depending on the filling technique.

The one-piece riser 114 advantageously provides a simple and effective means for coupling piping to a storage vessel 12. The piping in the cylindrical portion 116 of the riser 114 can be accessed easily upon removal of cover 130. Any leakage of the piping is contained in the riser 114 via seal ring 124. As described above, vapors and fuel can be returned to the tanker truck via space 215 during filling (Stage I Vapor Return) and to the vessel 12, when fuel is dispensed into an automobile or fuel container (Stage II Vapor Return).

Reinforced concrete 132 is poured together with holddown beam 38 to complete the installation of the structure 10. An overhead canopy 134 is supported by each column 39.

FIG. 12 shows a system having a multiple compartment vessel. Thus, 87 Octane fuel can be stored in compartment 23, while 92 or 93 Octane fuel can be stored in compartment 25. Cross-over piping structure 123 is provided which extends within the vessel 12 and into each riser 114. Piping 123 is coupled to line 121, of each dispenser 24 and 24'. Thus, 87 Octane, 93 Octane or 89 Octane, which is created by mixing the 87 and 93 Octane fuels, can be discharged from either dispenser 24 or 24'.

Figure 16:
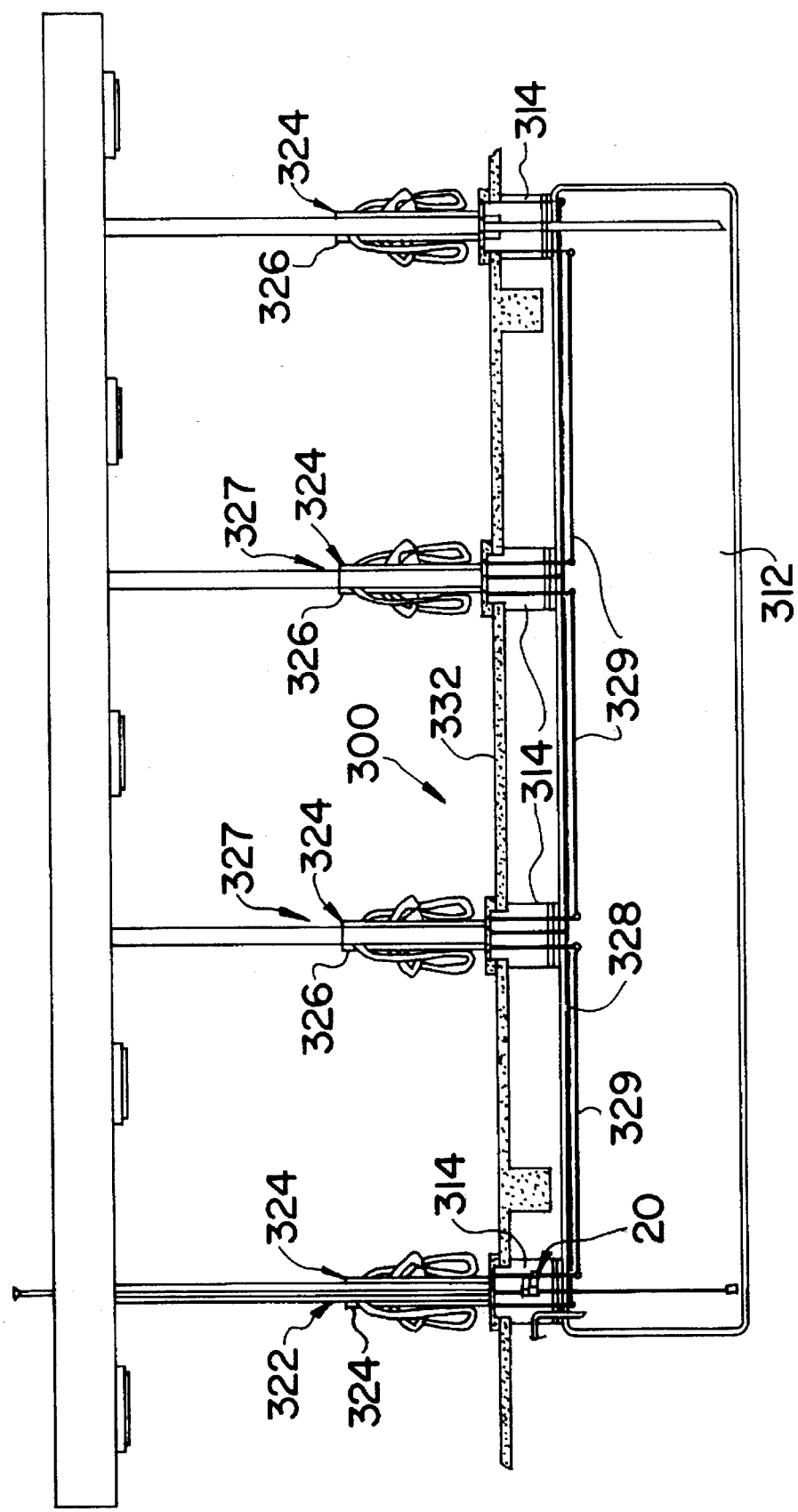
FIG. 16 is another embodiment of the unitized system using cross piping to fuel a vehicle from either side thereof with, for example, a single product "diesel" fuel.
Figure 16A:
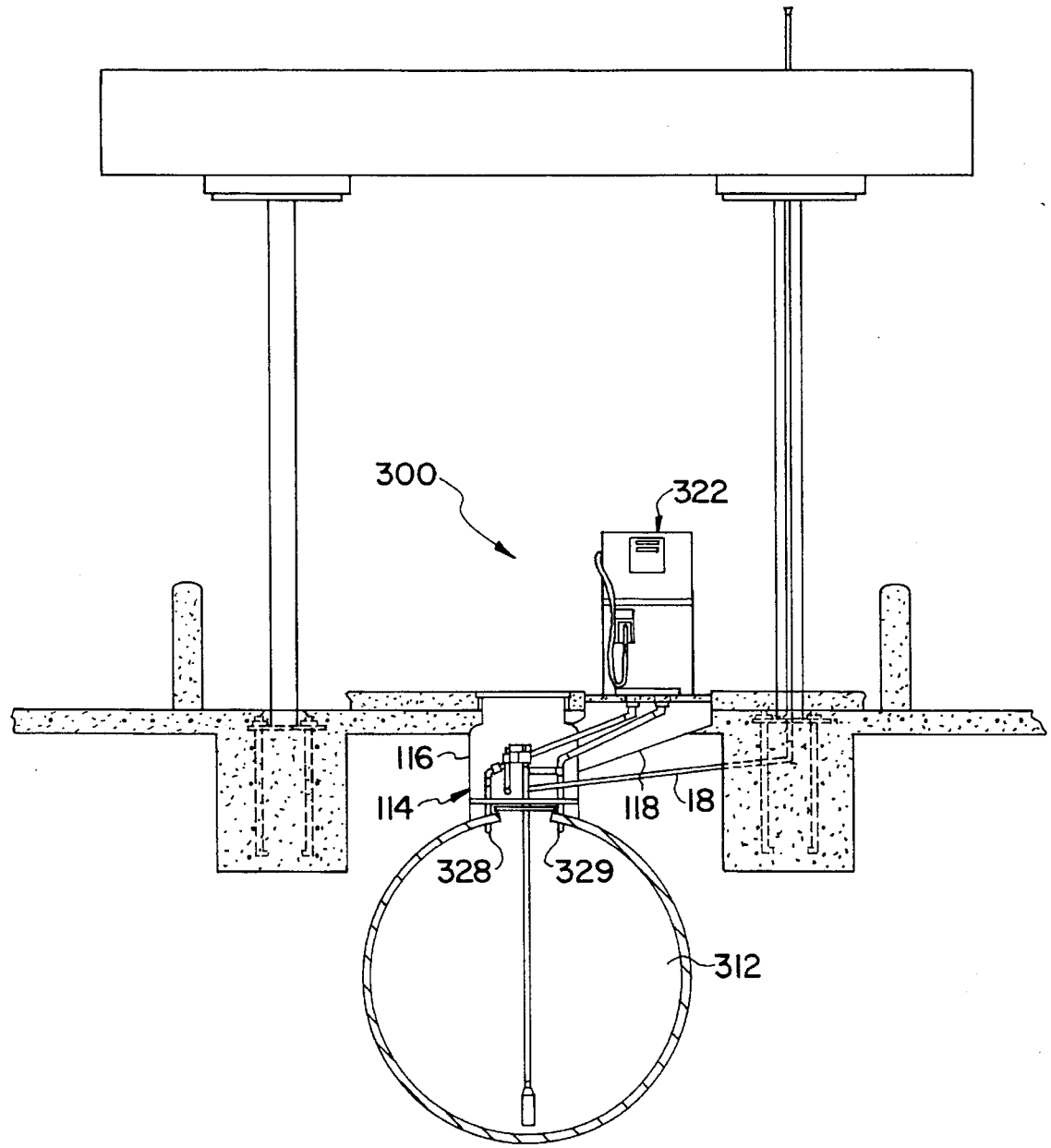
FIG. 16a is an end view of the unitized system of FIG. 16.

FIGS. 16 and 16a show another embodiment of a unitized tank structure 300, provided in accordance with the principles of the present invention. FIG. 16 shows a side elevation of the tank structure 300, which includes a single compartment vessel 312, a plurality of risers 314 and a dispenser associated with each riser 314. Pressure dispenser 322 is termed a "master-master" dispenser since it includes two master dispensers 324. Thus, dispenser 322 pumps fuel from the vessel. Dispensers 326 are termed "master-satellite" dispenser since they include a master dispenser 324 and a satellite dispenser 327 which are each fluidly coupled to dispenser 322 via pipings 328, 329, portions of which extend within vessel 312. This arrangement has particular utility when fueling large trucks. For example, if the vessel 312 contains diesel fuel, a truck can drive onto pad 332 and be fueled from either side thereof using either the dispenser 324 or the satellite dispensers 326.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A unitized tank structure comprising:

a vessel having at least first and second compartments;

fill lines coupled to the vessel providing access to fill said first and second compartments of said vessel with fuel;

at least one sump riser portion coupled to the vessel and extending therefrom;

at least first and second dispensing lines for dispensing fuel from the vessel, said dispensing lines being disposed within the sump riser portion and penetrating the vessel, each dispensing line extending within said vessel and within an associated one of said first and second compartments, said sump riser portion being constructed and arranged to contain fuel which may leak from said dispensing lines; and cross-over venting structure disposed within said vessel constructed and arranged to balance pressure in said first and second compartments when dispensing fuel from a compartment.

2. The unitized tank structure of claim 1, wherein a partition isolates said first and second compartments, said cross-over venting structure including a pipe assembly extending within said vessel and through said partition, said pipe assembly being in open communication with each of said first and second compartments, each said fill line being constructed and arranged to communicate with said pipe assembly so as to return vapor to said vessel during filling of said vessel.

3. The unitized tank structure according to claim 2, wherein each said fill line includes:

a dielectric bushing coupling the fill line to the vessel, a sleeve coupled to the bushing, a fill tube mounted coaxially within said sleeve, said fill tube including a portion having a diameter less than a diameter of said sleeve at a position where said pipe assembly communicates with said fill line, such that vapors may pass from said fill line to said pipe assembly and into said vessel during filling of said vessel.

4. The unitized tank structure according to claim 2, wherein said pipe assembly is of generally U-shaped configuration comprising a central portion and two spaced depending legs coupled to said central portion, said central portion being fixed to and extending through said partition such that one leg is disposed in each compartment, each of said legs including an overflow vent valve for preventing cross-contamination of fluid between said compartments.

5. The unitized tank structure of claim 2, in combination with at least one dispenser operatively associated with said dispensing lines for dispensing fuel from said vessel, said tank structure including a vent line in communication with said dispenser so that as fuel is dispensed from said vessel by said dispenser, vapors return to said vessel through said vent line via negative pressure created by dispensing of the fuel.

6. The unitized tank structure according to claim 1, further comprising:

at least one beam member disposed above said vessel and extending transversely with respect to a length of said vessel beyond an overall width of said vessel, said at least one beam member being constructed and arranged with respect to said vessel so as to hold said vessel in an operative position against buoyancy forces tending to lift the vessel from the operative position;

at least one support member having first and second ends, said first end being coupled to said beam member, said support member extending generally vertically upward from said beam member, said second end of said support member is disposed in a plane above said dispensing member; and an overhead canopy member supported by said second end of said support member.

7. A unitized tank structure comprising:

a vessel having at least first and second compartments isolated by a partition;

fill lines coupled to the vessel providing access to fill the vessel;

at least one sump riser portion coupled to the vessel and extending therefrom;

at least first and second dispensing lines disposed within the sump riser portion and penetrating the vessel so that said first dispensing line is in open communication with said first compartment and said second dispensing line extends into and through said first compartment and into open communication with said second compartment; and cross-over vent structure mounted to said partition so as to provide cross-over venting between said at least first and second compartments.

8. The unitized tank structure according to claim 7, wherein said cross-over vent structure includes a generally U-shaped vent assembly having a central portion and two spaced depending legs coupled to said central portion, said central portion being fixed to and extending through said partition such that one leg is disposed in each compartment, each of said legs including an overflow vent valve for preventing cross-contamination of fluid between said compartments.

9. A structure for storing and dispensing fluids comprising:

an elongated vessel having a plurality of isolated compartments;

fill lines coupled to the vessel providing access to fill the vessel;

at least one sump riser portion coupled to the vessel and extending vertically upward therefrom;

at least one vacuum extraction system disposed within said sump riser portion, the extraction system including fluid return structure to permit one of vapor and liquid which accumulates in the sump riser portion to be returned to the vessel by negative pressure created within said vessel;

at least one vent line disposed within the sump riser portion and extending therefrom so as to be in contact with the atmosphere to vent positive pressure from said vessel;

at least one dispensing line disposed within the sump riser portion and penetrating the vessel;

at least one dispensing member coupled to the dispensing line for removing fluid from the vessel;

at least one beam member disposed above said vessel and extending transversely with respect to a length of said vessel beyond an overall width of said vessel, said at least one beam member being constructed and arranged with respect to said vessel so as to hold said vessel in an operative position against buoyancy forces tending to lift the vessel from the operative position; and at least one support member having first and second ends, said first end being coupled to said beam member, said support member extending generally vertically upward from said beam member, said second end of said support member is disposed in a plane above said dispensing member and is constructed and arranged to support an overhead canopy member.

10. The structure of claim 9, wherein said vent line extends from said sump riser portion and is constructed and arranged to cooperate with said support member so that the vent line communicates with the atmosphere near the second end of said support member.

11. The structure of claim 9, wherein two beam members and two support members are provided, said beam members being disposed in a generally parallel relation.

12. The structure of claim 9, further comprising a vacuum monitoring system including a vacuum pump, said vessel being a doubled-wall vessel having inner and outer walls defining an interstitial space therebetween, said system including a gauge extending to said interstitial space for monitoring vacuum therein, said system including visual indicators responsive to a vacuum level for alerting an operator of the vacuum level which indicates whether the vessel is leaking.

13. The structure of claim 9, wherein the fluid return structure includes a pipe element having an opening disposed near an exterior surface of the vessel and a check valve coupled between the pipe element and the vessel, the pipe element and check valve being disposed within the sump riser portion, whereby said negative pressure within the vessel creates a vacuum which pulls said one of vapor and liquid through the opening of the pipe element and through the check valve back into the vessel, said fluid return structure including a valve associated with said opening for restricting the size thereof to selectively regulate the vacuum for returning vapor or fuel back into the vessel.

14. A unitized tank structure comprising:

a vessel defining a fuel compartment;

a fill line coupled to the vessel providing access to fill said compartment;

at least first and second sump riser portions coupled to the vessel and extending therefrom in spaced relation;

a dispenser mounted with respect to each sump riser portion; and a dispensing line coupled to each dispenser and disposed within an associated sump riser portion and penetrating the vessel, said dispensing lines being fluidly coupled together within said compartment via a common connecting line.

15. A unitized tank structure comprising:

a vessel having at least first and second compartments;

fill lines coupled to the vessel providing access to fill said first and second compartments of said vessel with fuel;

a sump riser portion sealingly coupled to the vessel and extending therefrom;

at least first and second dispensing lines for dispensing fuel from the vessel, said dispensing lines being disposed within the sump riser portion, each said dispensing line (1) penetrating the vessel at a location within said sump riser portion and (2) extending within an associated one of said first and second compartments, said sump riser portion being constructed and arranged to contain fuel which may leak from said dispensing lines so that any fuel leaking into said sump riser portion remains within said sump riser portion.

* * * * *

UNITED STATES PATENT AND TRADEMARK OFFICE
CERTIFICATE OF CORRECTION

PATENT NO. : 5,586,586
DATED : December 24, 1996
INVENTOR(S) : FIECH et al.

It is certified that error appears in the above-indentified patent and that said Letters Patent is hereby corrected as shown below:

On the title page: change "15"claims to "20".

Column 12, line 34, change "remains" to --is contained--.

Column 12, after line 34, add the following:

--16. A unitized tank structure according to claim 15, wherein said sump riser portion is coupled to said vessel so as to communicate with only one of said compartments.

17. A unitized tank structure according to claim 15, wherein said sump riser portion comprises:

a main portion having first and second ends and sidewalls between said first and second ends defining an interior space, said second end being constructed and arranged to be sealingly coupled to the vessel, said first end being open, a cover covering said first end and being constructed and arranged to be removed to access said interior space; and at least one arm portion extending generally horizontally from a side wall of said main portion, said arm portion having sidewalls defining an interior cavity communicating with said interior space, said arm portion having an open end, generally adjacent said first end of said main portion, said open end being sized and configured cooperate with a dispenser for dispensing fuel from the vessel.

18. A unitized tank structure according to claim 17, wherein said main portion and said at least one arm portion are formed integrally.

19. A unitized tank structure according to claim 18, wherein said main portion and said at least one arm portion are composed of cross-linked polyethylene.

UNITED STATES PATENT AND TRADEMARK OFFICE
CERTIFICATE OF CORRECTION

PATENT NO. : 5,586,586
DATED : December 24, 1996
INVENTOR(S) : FIECH et al.

It is certified that error appears in the above-indentified patent and that said Letters Patent is hereby corrected as shown below:

20. A unitized tank structure according to claim 15, further comprising valving defining a return path from said sump riser portion to said vessel such that fuel contained within said sump riser portion may be returned to said vessel.--

Signed and Sealed this

Twenty-ninth Day of April, 1997

*Attest:*

BRUCE LEHMAN

*Attesting Officer*   Commissioner of Patents and Trademarks